(12) United States Patent
Bernasconi et al.

(10) Patent No.: US 6,381,383 B1
(45) Date of Patent: Apr. 30, 2002

(54) LARGE N×N WAVEGUIDE GRATING ROUTER

(75) Inventors: Pietro Arturo Bernasconi, Eatontown; Christopher Richard Doerr; Corrado Pietro Dragone, both of Middletown Township, Monmouth County, all of NJ (US)

(73) Assignee: Agere Systems Guardian Corp, Orlando, FL (US)

( * ) Notice: Subject to any disclaimer, the term of this patent is extended or adjusted under 35 U.S.C. 154(b) by 0 days.

(21) Appl. No.: 09/556,558

(22) Filed: Apr. 24, 2000

(51) Int. Cl.[7] ................................................. G02B 6/28
(52) U.S. Cl. ............................ 385/24; 385/37; 385/39; 385/46; 385/130
(58) Field of Search ........................... 385/24, 39, 37, 385/46, 130, 48

(56) References Cited

U.S. PATENT DOCUMENTS 6,181,849 B1 * 1/2001 Lin et al. ...................... 385/24

OTHER PUBLICATIONS

C. Dragone, "A N×N optical multiplexer using a planar arrangement of two star couplers", IEEE Photon. Technol. Lett. 3, 812–815 (1991).
C. Dragone, C. A. Edwards, and R. C. Kistler, "Integrated optics N×N multiplexer on silicon", Photon. Technol. Lett. 3, 896–899 (1991).
H. Takahashi, S. Suzuki, K. Katoh, and I. Nishi "Arrayed–waveguide grating for wavelength division multi/demultiplexer with nanometer resolution", Electron. Lett. 26, 87–88 (1990).
K. Okamoto, K. Moriwaki, and S. Suzuki, "Fabrication of 64×64 arrayed–waveguide grating multiplexer on silicon", Electron. Lett. 31, 184–186 (1995).
K. Okamoto, T. Hasegawa, O. Ishida, A. Himeno, and Y. Ohmori, "32×32 arrayed–waveguide grating multiplexer with uniform loss and cyclic frequency characteristics", Electron. Lett. 33, 1865–1866 (1997).
H. Takahashi, K. Oda, H. Toba, and Y. Inoue, "Transmission characteristics of arrayed waveguide N×N wavelength multiplexer", J. Lightwave Technol. 13, 447–455 (1995).
M. K. Smit, "New Focusing and dispersive planar component based on an optical phase array", Electron. Lett. 24, 385–386 (1988).
M. S. Borella, "Simple Scheduling Algorithm for Use with a Waveguide Grating Multiplexer Based Local Optical Networky", Photonics Net. Comm.., 1, 35–48 (1999).

* cited by examiner

Primary Examiner—Darren Schuberg
Assistant Examiner—Fayez Assaf

(57) ABSTRACT

The limitation of N in an N×N Wavelength Grating Router (WGR) is determined to be because of the intrinsic diffraction characteristics of the grating that occurs when N approaches the diffraction order m at which the grating operates. The N in a N×N WGR device is maximized for input signal channels equally spaced either in frequency or in wavelength. For the wavelength case, N is increased by appropriate changes in the spacing of the output ports of the WGR and/or by slightly correcting the channels wavelengths.

8 Claims, 12 Drawing Sheets

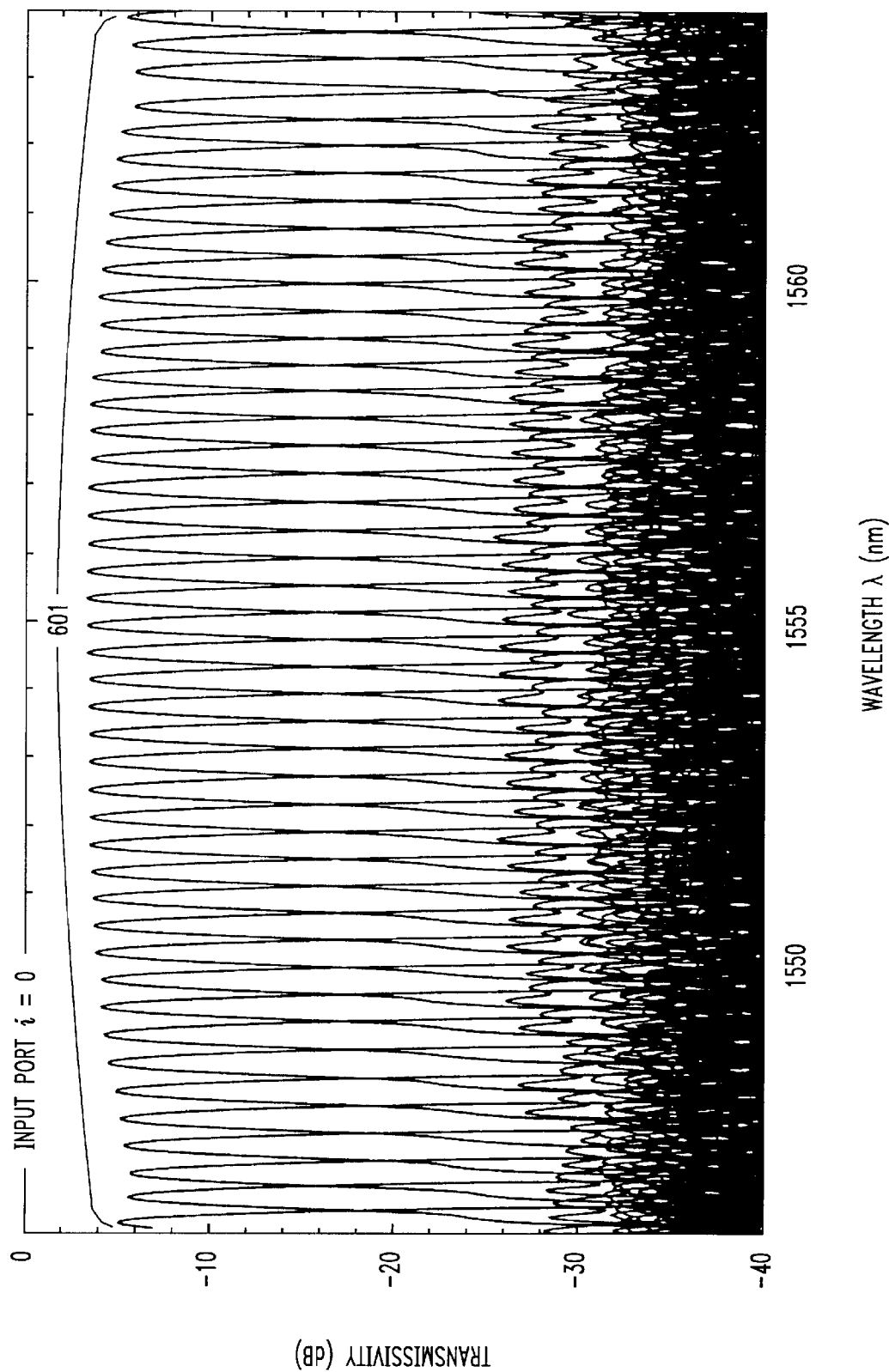

LARGE N×N WAVEGUIDE GRATING ROUTER

CROSS-REFERENCE TO RELATED APPLICATION

Related subject matter is disclosed in the concurrently filed application entitled "MULTIPLE WAVELENGTH LASER HAVING A REDUCED NUMBER OF WAVELENGTH CONTROLS" by the inventors, C. R. Doerr., C. P. Dragone, and A. M. Glass, which is assigned to the same Assignee as the present application.

TECHNICAL FIELD OF THE INVENTION

The present invention relates to a Waveguide Grating Router (WGR) and, more particularly, to a WGR having a large number N of input and output ports.

BACKGROUND OF THE INVENTION

Large N×N waveguide grating routers (WGR) represent an excellent solution for providing large optical cross-connects: They are fully passive elements and they can provide strictly non-blocking connections for a set of N optical channels. [1–5]. (Note in this specification, a reference to another document is designated by a number in brackets to identify its location in a list of references found in the Appendix)

However, due to the intrinsic diffraction characteristics of the grating, restrictions limit the size of a N×N WGR. Additional and even more severe limitations arise if the WGR is designed to cross-connect channels which are equally spaced in frequency [4,6] as opposed to being equally spaced in wavelength.

Because the number of wavelengths being used in an optical system is constantly increasing, there is a continuing need to increase the size of the N×N WGRs used as optical cross-connects.

SUMMARY OF THE INVENTION

In accordance with the present invention, we have recognized that because of the intrinsic diffraction characteristics of the grating, restrictions in the size of N generally happens when N approaches the diffraction order m at which the grating operates. We have developed a technique for maximizing N in a N×N WGR device for channels equally spaced either in frequency or in wavelength.

For the wavelength case, N is increased by appropriate changes in the spacing of the output ports of the WGR and/or by slightly correcting the channels wavelengths.

More particularly, the N in a N×N WGR is maximized for input signals including N equally spaced wavelengths by using an output coupler having N output ports that are shifted from their original uniformly spaced position. In another embodiment used with input signals having N wavelengths or frequencies, the N in a N×N WGR is maximized by using N wavelengths or frequencies that are not equally spaced. In yet another embodiment, used with input signals having N wavelengths or frequencies, the N in a N×N WGR is maximized by using an output coupler having N output ports that are spaced to maximize the weakest signal transmission coefficient of at least one of the N wavelengths or frequencies from any of the N input ports.

BRIEF DESCRIPTION OF THE DRAWINGS

In the drawings,

FIG. 6a shows the measured fiber-to-fiber transmission spectra referred to the central input port (i=0) in an illustrative 40×40 WGR with channels equally spaced by $\Delta\lambda$=0.4 nm and shifted output ports.

In the following description, identical element designations in different figures represent identical elements. Additionally in the element designations, the first digit refers to the figure in which that element is first located (e.g., 102 is first located in FIG. 1).

DETAILED DESCRIPTION

Grating diffraction properties

Figure 1:
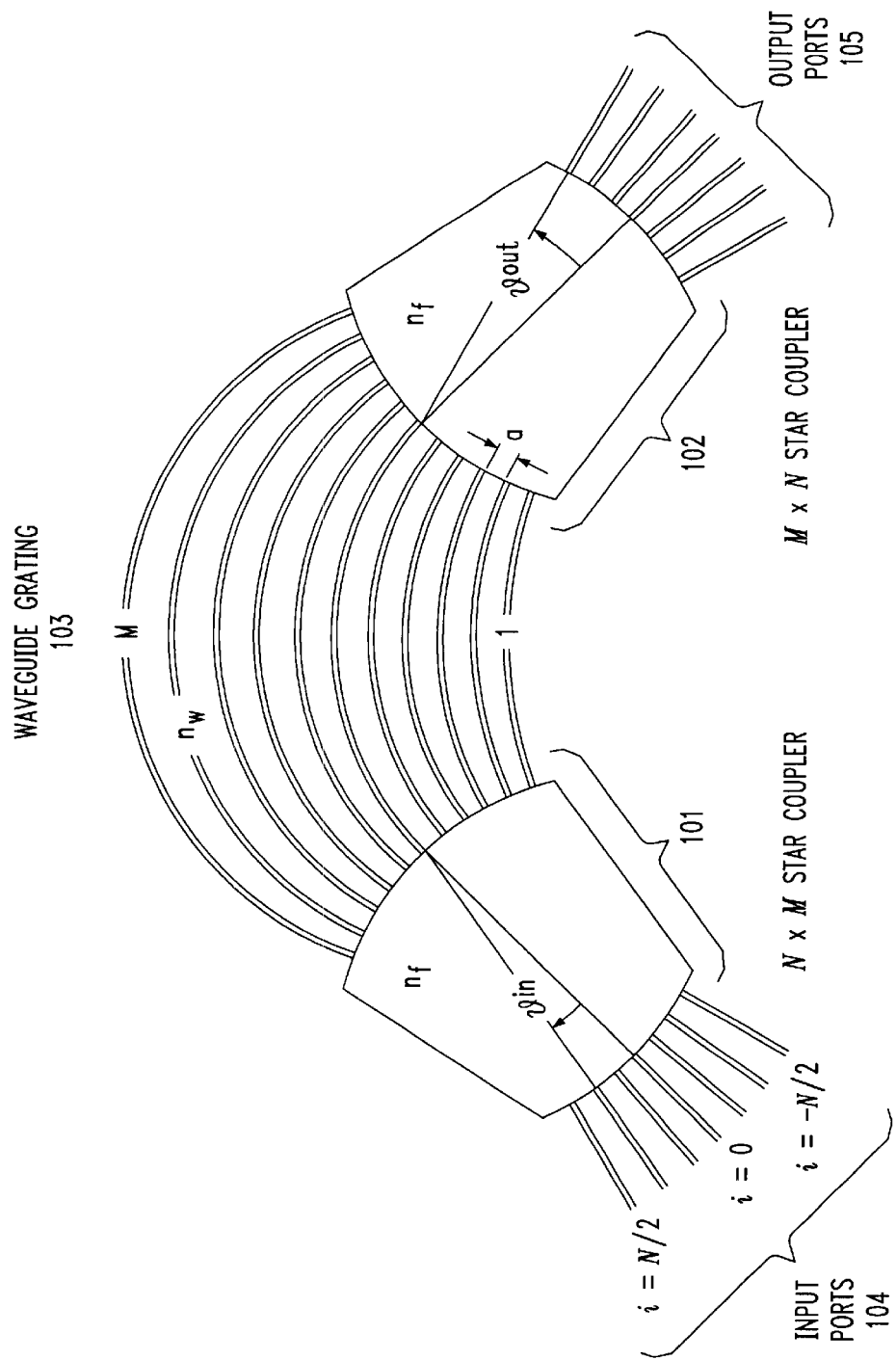
FIG. 1 shows an illustrative block diagram of a N×N WGR where the free spaces of the two N×M

With reference to FIG. 1, we describe a Wavelength Grating Router (WGR) which consists of two N×M star couplers 101 and 102 connected by a waveguide grating 103 including M waveguides of unequal length. [1] The functionality of a diffraction grating is obtained by letting the optical path-length of the M waveguides 103 increase linearly from waveguide 1 to waveguide M. With a proper design, when every input port 104 receives an input signal including the same set of N optical channels, each output port 105 receives N different channels each coming from a different input. This provides the N×N strict-sense non-blocking-connect. [1,7]

The size of N is primarily given by the diffraction properties of the grating and secondarily by the spectral dispersion of the material refractive indices. By first neglecting the latter correction terms, for small diffraction angles the angular aperture between each two diffracted signals of input waves equally spaced in wavelength is a constant. Note, due to the equivalence between WGR's and bulk gratings, in the following we shall use interchangeably input (output) ports of the WGR and incident (diffracted) angles at the grating. This follows from the well-known relation $$a(\sin\theta_\lambda^{in} - \sin\theta_\lambda^{out}) = m\lambda \tag{1}$$

where a is the grating period, m is an integer, and $\theta_\lambda^{in/out}$ are the incident and the diffracted angles (shown in FIG. 1) for the wavelength $\lambda$ in the material and/or waveguide. For small angles and for two neighboring wavelengths $\lambda$ and $\lambda'$ ($\equiv\lambda+\Delta\lambda$) incident under the same angle, Eq. (1) simplifies into $$\Delta\theta^{out} \equiv \theta_{\lambda'}^{out} - \theta_{\lambda}^{out} \approx m/a(\lambda'-\lambda) = m/a\Delta\lambda \qquad (2)$$

where $\Delta\theta^{out}$ is independent of both the wavelength and the incident angle $\theta^{in}$. The latter conclusion is not valid when Eqs. (1) and (2) are expressed in term of frequency with $v' \equiv v + \Delta v$. Thus for a given grating order m, $\Delta\theta^{out}$ is proportional to $\Delta\theta$.

Figure 2A:
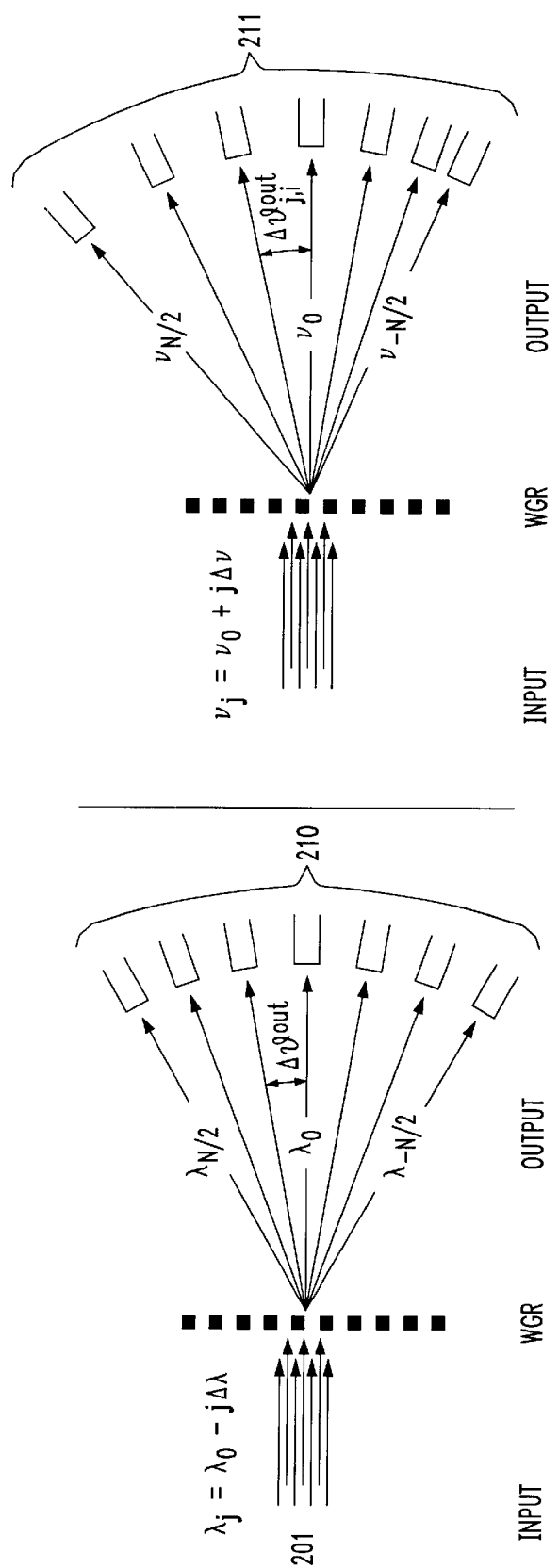
FIG. 2 shows the diffraction at a WGR for channels equally spaced in wavelength (left) and in frequency (right) for (a) diffraction with a fixed input port and fixed diffraction order, (b) diffraction with different input ports and fixed diffraction order m, and (c) diffraction with a fixed input port and two different diffraction orders m and m−1.
Figure 2B:
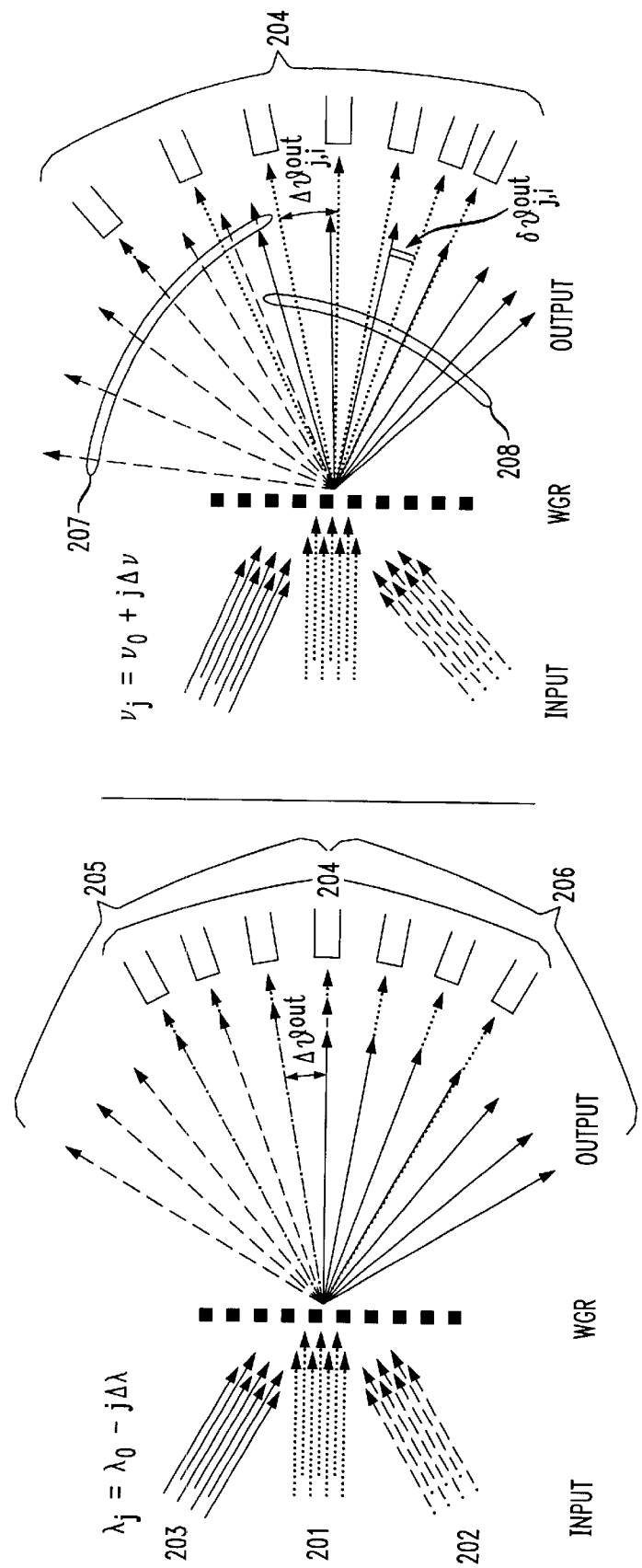

The angles of incidence can be chosen so that the different sets of output angles belonging to each $\theta^{in}$ overlap, although mutually shifted by $\Delta\theta^{out}$. So, for N evenly spaced wavelengths incident under each of the N input angles will cover a set of only 2N output angles, as shown in FIGS. 2a and 2b. However, the overlapping among wavelengths coming from different input angles might not be perfect if the effects of the wavelength dispersion of the refractive indices are included. We define the wavelengths as $$\lambda_j = \lambda_0 - j\Delta\lambda \qquad (3)$$

with $j=0, \pm 1, \pm 2, \ldots, \pm N/2$. Staying in the same diffraction order m, the output angular mismatch experienced by $\lambda_j$ incident under the input angle $\theta_i$ (with respect to case where the central incident angle $\theta_{i=0}$ is used) is of the kind $$\delta\vartheta_{j,i}^{out} = \frac{m}{a} \frac{\lambda_0}{n_w(\lambda_0)}$$

$$\left\{ \frac{1}{n_w(\lambda_0)} \left[ \frac{n_w(\lambda_j) - n_w(\lambda_0)}{n_f(\lambda_j)} - \frac{n_w(\lambda_i) - n_w(\lambda_0)}{n_f(\lambda_i)} - \frac{n_w(\lambda_{j-i}) - n_w(\lambda_0)}{n_f(\lambda_{j-i})} \right] + \right.$$

$$\left. \frac{\Delta\lambda}{\lambda} \left[ \frac{j}{n_f(\lambda_j)} - \frac{i}{n_f(\lambda_i)} - \frac{j-i}{n_f(\lambda_{j-i})} \right] \right\} \qquad (4)$$

Eq. (4) vanishes when the dispersion of the refractive indices is neglected. In Eq.(4), $n_w$ and $n_f$ refer to the refractive indices of light propagating in the waveguides and in the free space, respectively, inside a WGR (see FIG. 1).

On the other hand, for optical channels equally spaced in frequency ($v_j \equiv V_0 + j\Delta v$), Eq.(4) reads as $$\delta\vartheta_{j,i}^{out} = \frac{m}{a} \frac{c}{v_0 n_w(v_0)} \left\{ \frac{1}{n_f(v_j)} \left[ n_w(v_j) - n_w(v_0) \frac{v_0}{v_j} \right] - \right.$$

$$\left. \frac{1}{n_f(v_i)} \left[ n_w(v_i) - n_w(v_0) \frac{v_0}{v_i} \right] - \frac{1}{n_f(v_{j-i})} \left[ n_w(v_{j-i}) - n_w(v_0) \frac{v_0}{v_{j-i}} \right] \right\} \qquad (5)$$

Here, $\delta_{j,i}^{out}$ does not vanish even by neglecting the dispersion of the refractive indices. Further, Eq. (5) is explicitly frequency dependent which deteriorates the overlapping when frequency and input angle deviate from the central frequency $v_0$ and from the central input angle $\theta_0$, respectively. Nevertheless, the deviation is small as long as $$\frac{\delta\vartheta_{j,i}^{out}}{\Delta\vartheta} = \frac{1/v_i - 1/v_j}{1/v_{(j-i\pm 1)} - 1/v_0} \ll 1 \qquad (6)$$

A bad overlapping leads to a deterioration of the device characteristics. So, N×N WGR's the optical channels have to be equally spaced in wavelength if the optimum performance in terms of losses and cross-talk is preferred. However, this fundamental requirement stays latent in devices designed for channels equally spaced in frequency as long as the covered frequency span is small enough. How small is "small enough" shall be quantified in the following by taking Eq. (6) as a starting point.

Wrap-around limitations

Figure 2C:
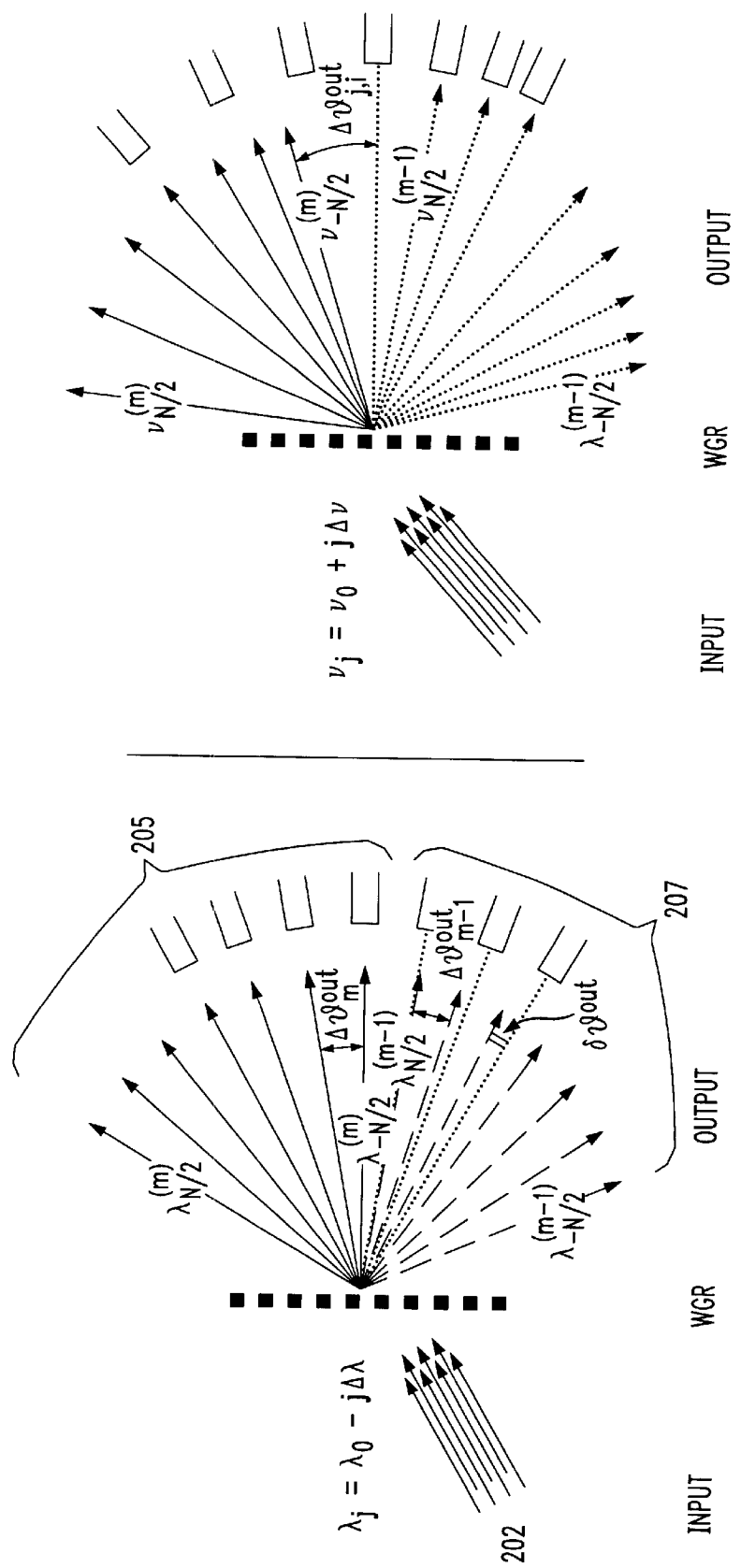

The discussion presented in the previous section assumes the WGR to operate with a fixed diffraction order m. Additional restrictions arise when the mapping of input-output ports is achieved by using different diffraction orders. This situation occurs when the N×N WGR has to operate with a unique set of N wavelengths or frequencies for all input ports. With reference to FIG. 2 there is shown the diffraction at an equivalent conventional diffraction grating for channels equally spaced in wavelength (left column) and in frequency (right column) for (a) diffraction with a fixed input port 201 and fixed diffraction order m, (b) diffraction with different input ports 201, 202, 203 and fixed diffraction order m, and (c) diffraction with a fixed input port 202 and two different diffraction orders m and m−1. Note that for channels equally spaced in wavelength (left) produces diffracted channels that have an equal spatial separation 210 (and consequentially, equal output port spacing). In contrast, channels equally spaced in frequency (right) do not produce diffracted channels that have equal spatial separation, but rather have a spacing that increases in a counter-clockwise direction 212 (as do the output port spacing). As illustrated in FIG. 2b and 2c, by shifting the input port the diffracted channels are distributed over a shifted angular sector which partially falls outside the sector covered by the N output ports 204. For example, in FIG. 2b-left, when the input port is shifted from port 202 to 203 or 204, the diffracted channels are shifted from angular sector 204 to 205 or 206, respectively. Thus, the N×N connectivity is lost. Note in FIG. 2b-right, that when the input port is shifted the equal frequency spacing input signal produces diffracted channels 207 and 208 that have a spacing that does not align with the spacing between output ports 204. Thus for an equally spaced frequency signal, the N×N connectivity is also lost.

To obviate the N×N connectivity loss, the next higher m+1 and next lower m−1 diffraction orders are used to setup the so-called periodic grating response or wrap-around. By an appropriate choice of the grating period a, as soon as one channel falls out on one side of the angular sector covered by the output ports 204, the next diffraction order moves in from the other side replacing the "lost" channel with its copy in the next diffraction order. As shown in FIG. 2c-left, the input signal to input port 202 results in diffraction order m distributed in sector 205 and diffraction order m−1 distributed in sector 207. Thus, output ports 204 would carry channels from both diffraction orders m and m−1.

However, the resort to different diffraction order introduces additional misalignments. The origin resides in Eq. (2) which clearly shows that the angular aperture between two neighboring channels entering the same input port depends on the diffraction order m. Therefore, by using the same input ports the overlapping among the diffracted channels belonging to different diffraction order is lost.

For channels equally spaced in wavelength, although $\Delta\theta^{out}$ is still constant inside each diffraction order, the misalignment expressed by Eq. (4) has to be corrected when $|j-i|>N/2$ into $$\delta\vartheta_{j,i}^{out} = \frac{m}{a} \frac{\lambda_0}{n_w(\lambda_0)} \left\{ \frac{1}{n_w(\lambda_0)} \left[ \frac{n_w(\lambda_j) - n_w(\lambda_0)}{n_f(\lambda_j)} - \right. \right. \qquad (7)$$

$$\left. \frac{n_w(\lambda_i) - n_w(\lambda_0)}{n_f(\lambda_i)} - \frac{n_w(\lambda_{j-i\pm N}) - n_w(\lambda_0)}{n_f(\lambda_{j-i\pm N})} \right] +$$

$$\left. \frac{\Delta\lambda}{\lambda} \left[ \frac{j}{n_f(\lambda_j)} - \frac{i}{n_f(\lambda_i)} - \frac{j-i\pm N}{n_f(\lambda_{j-i\pm N})} \right] \right\} \pm \frac{1}{a} \frac{\lambda_0 - j\Delta\lambda}{n_f(\lambda_j)}$$

which, in a first approximation, can be simplified to $$\delta\vartheta_{j,i}^{out} \approx \mp \frac{1}{a} \frac{j\Delta\lambda}{n_f(\lambda_j)} \quad (8)$$

Equation (8) shows how coefficients vary for all wavelengths originating from a given input port. The misalignment increases linearly with the distance between the central wavelength $\lambda_0$ and the wavelength $\lambda_j$ diffracted in the next higher (sign−) or in the next lower (sign+) diffraction order. Notice that, by neglecting the wavelength dispersion of the refractive indices, the misalignment for a specific channel does not depend on the input port.

Thus, half of the angular separation between two output ports ($\Delta\theta^{out}/2$) combined with the maximum value of $\delta\theta^{out}$ define an upper limit for the wavelength span $N\Delta\lambda$ and, for a given channel spacing $\Delta\lambda$, how many channels can be efficiently cross-connected. According to Eq. (8), the maximum deviation $\delta\theta_{max}^{out}$ occurs with the longest or the shortest wavelength, i.e. when $j=\pm N/2$ so that the previous condition $$\delta\theta_{max}^{out} \ll \Delta\theta^{out}/2 \quad (9)$$

can be expressed as $$\frac{\delta\vartheta_{max}^{out}}{\Delta\vartheta^{out}} = N^2 \frac{\Delta\lambda}{\lambda} \frac{n_w^g}{n_w(\kappa_0)} = \frac{N}{m} \ll 1 \quad (10)$$

where $n_w^g$ is the group index in the waveguides. As already mentioned, Eq. (10) gives only an upper limit for the usable wavelength span, because in a real device the tolerated misalignment is set by design and performance parameters such as the width of the output ports, the affordable additional losses, and cross-talk level.

An equivalent approach can be followed for channels equally spaced in frequency although the analysis of this case presents a higher degree of complexity due to the fact that, as already mentioned, $\Delta\theta^{out}$ is not a constant for a given diffraction order m and due to the fact that $\delta\theta_{j,i}^{out}$ is an explicit function of the frequency. Instead of presenting the abstruse equation for $\delta\theta_{j,i}^{out}$, the consequences of channel equally spaced in frequency shall be illustrated graphically in the following section.

Wavelength vs. freguency: An example

As a corollary to the equations, we determine why large N×N WGR's operating with a single set of N optical channels should be designed for equally spaced wavelengths and not frequencies by evaluating in the two cases $\delta\theta_{j,i}^{out}/\Delta\theta^{out}$ for N=41. The relative deviation is calculated as a function of both the input port i and the wavelength or frequency channel j. The channel spacing is $\Delta\lambda$=0.4 nm or $\Delta\nu$=50 GHz, respectively. The refractive indices correspond to devices fabricated in silica where the spectral dispersion can be safely neglected over the spectral range of interest.

Figure 3A:
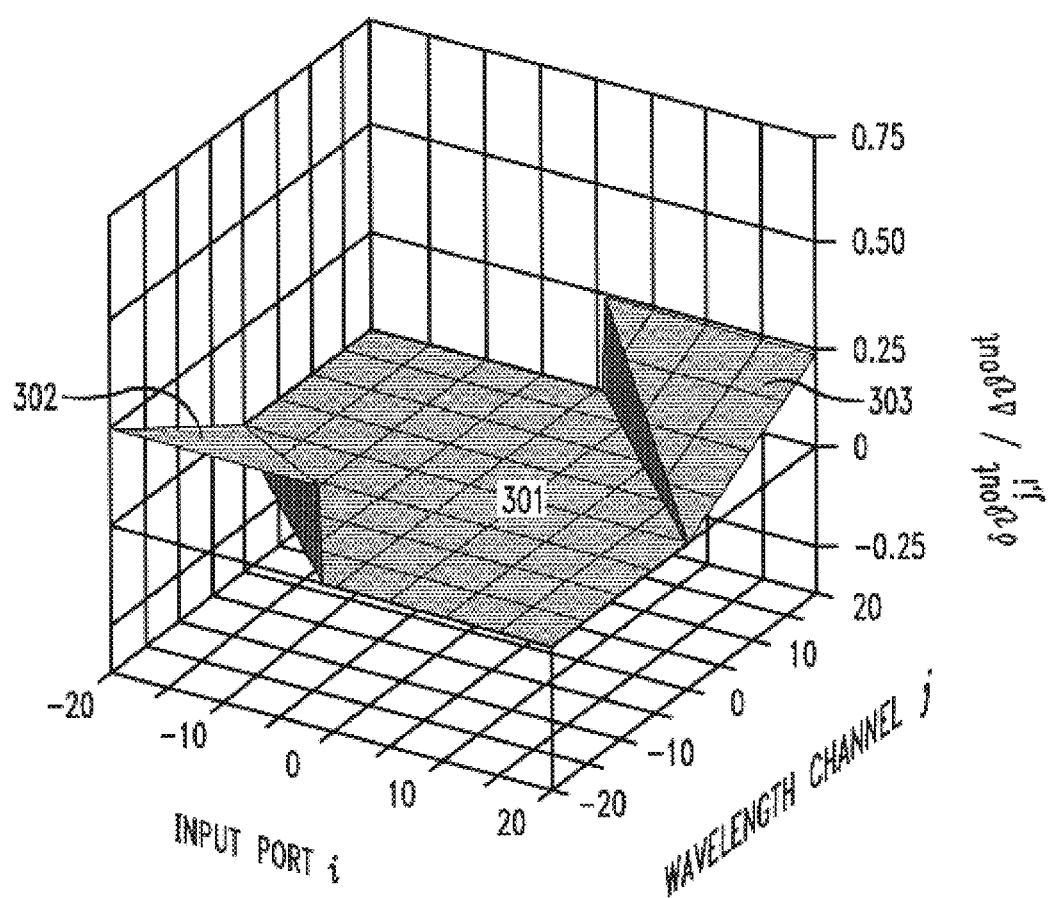
FIG. 3 shows the calculated relative angular deviation $\delta\theta^{out}/\Delta\theta^{out}$ as a function of the input port i and the optical channel j for channels equally spaced in (a) wavelength or (b) frequency in an illustrative 41×41 WGR.
Figure 3B:
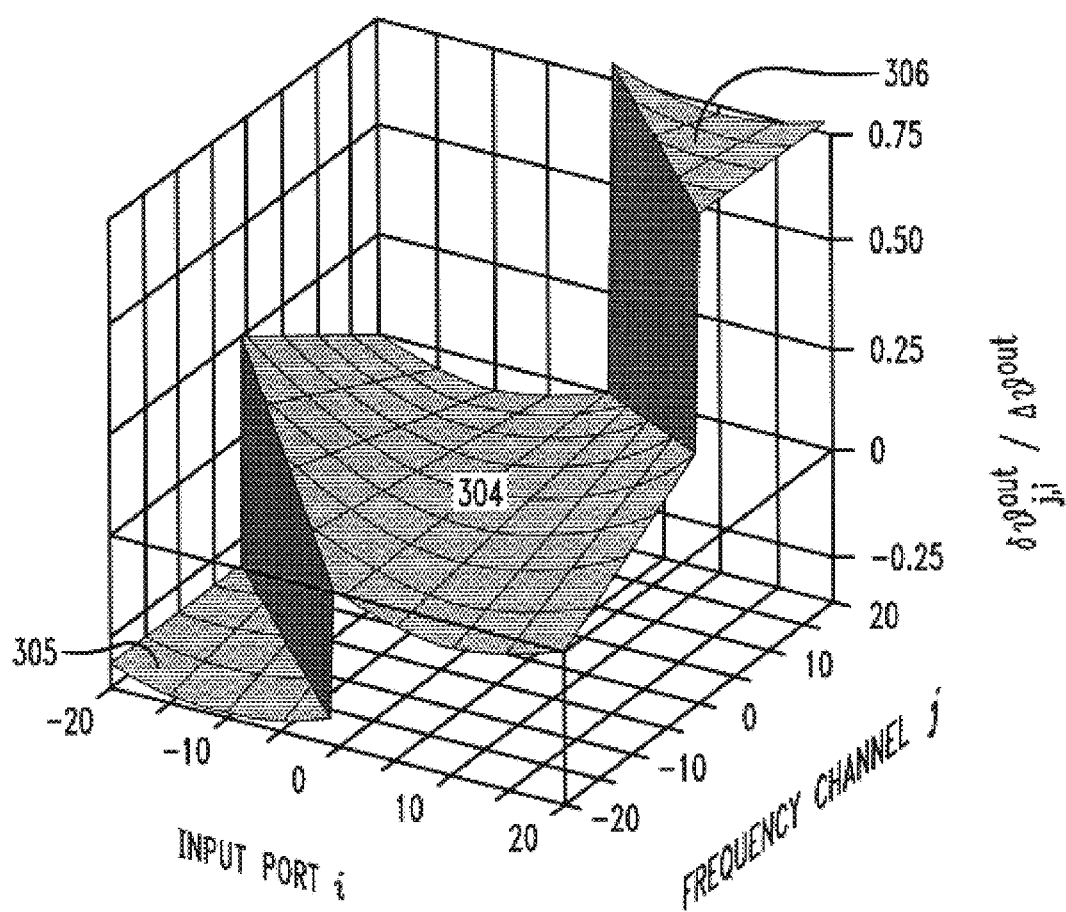

With reference to FIG. 3 there is shown the calculated relative angular deviation $\delta\theta^{out}/\Delta\theta^{out}$ as a function of the input port i and the optical channel j for channels equally spaced in (a) wavelength or (b) frequency in an illustrative 41×41 WGR. The wavelength channels are defined as $\lambda_j=\lambda_0-j\Delta\lambda$ where $\lambda_0$=1555 nm and $\Delta\lambda$=0.4 nm. The frequency channels are defined as $\nu_j=\nu_0+j\Delta\nu$ where $\nu_0=c/\lambda_0$ and $\Delta\nu$=50 GHz. The difference between the two curves FIG. 3a and 3b is substantial: The WGR designed for channels equally spaced in wavelength performs better. Both the maximum deviation $\delta\theta_{max}^{out}$ as well as the misalignment at each single (j,i)-combination are remarkably smaller than in the case for channels equally spaced in frequency.

In FIG. 3a, for channels equally spaced in wavelength, Eq. (4) defines the flat central region 301 where the almost vanishing deviation is given by the negligible wavelength dispersion of the refractive indices in silicon. The resort to different diffraction orders is the origin of the "wings" 302 and 303 characterized by the linear increase for increasing deviation from $\lambda_0$ as described by Eq. (8). Note that the deviation at the "wings" has always the same sign. This peculiarity is discussed in a later paragraph.

In FIG. 3b, for channels equally spaced in frequency, Eq. (5) defines a curved central region 304 in which the worst case is already even worse than $\delta\theta_{max}^{out}$ calculated for evenly spaced wavelengths. Similarly to FIG. 3a, the use of different diffraction orders produces "wings" 305 and 306 but, in this case, with much higher amplitudes and with opposite sign. It should be noted that for the same $\delta\theta_{max}^{out}$ obtained in a 41×41 WGR with channel equally spaced in frequency, for evenly spaced wavelengths the WGR could be as large as 71×71.

Once again, we note that these curves in FIG. 3 do not take into account the restrictions imposed by design and performance parameters such as the width of the output ports, the affordable additional losses, and tolerated cross-talk level.

Improvements

Figure 4A:
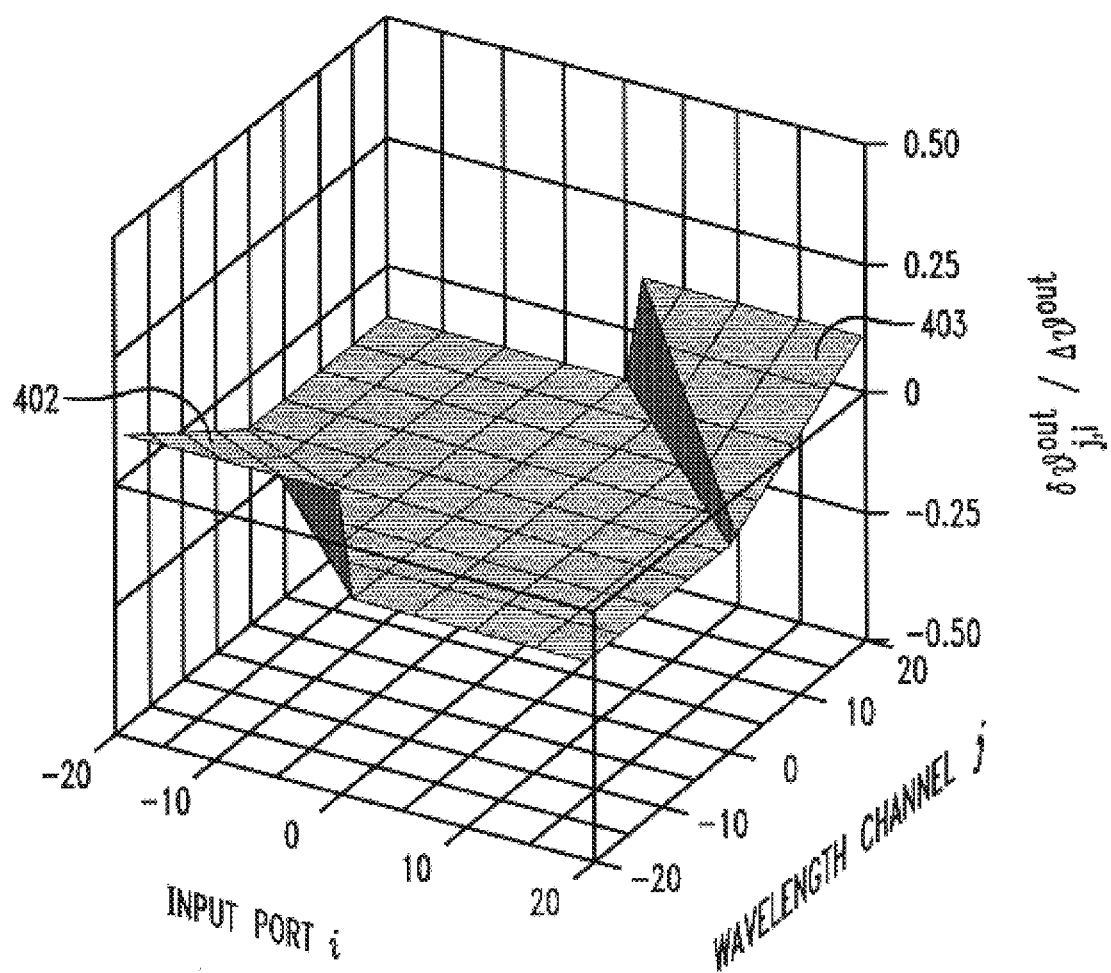
FIG. 4 shows the calculated relative angular deviation $\delta\theta^{out}/\Delta\theta^{out}$ as a function of the input port i and the optical channel j in an illustrative 41×41 WGR for (a) channels equally spaced in wavelength and shifted output ports and (b) parabolically detuned wavelengths.
Figure 4B:
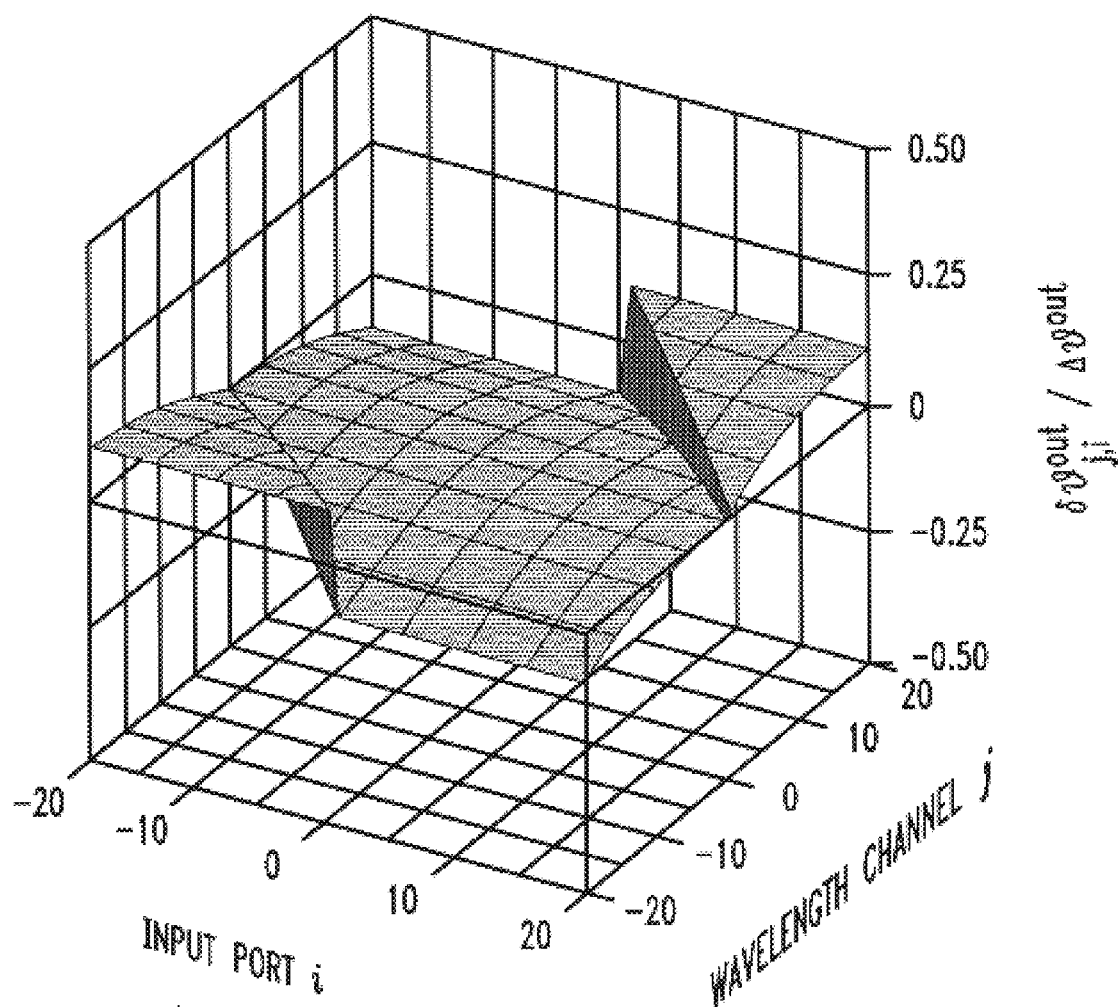

In FIG. 3a, the curve always assumes positive values and the deviation ranges from ~0 in the central region to $\delta\theta_{max}^{out}$~0.25 for the shortest and the longest wavelengths at the "wings". This peculiar property allows us to halve the value of $\delta\theta_{max}^{out}$ by shifting the position of the output ports by half of this angle. The result is shown in FIG. 4a. With reference to FIG. 4 there is shown the calculated relative angular deviation $\delta\theta^{out}/\Delta\theta^{out}$ as a function of the input port i and the optical channel j in an illustrative 41×41 WGR for (a) channels equally spaced in wavelength and shifted output ports. Note, comparing FIG. 3a to FIG. 4a, the output port shifting procedure degrades the angular deviation in the flat region of the curve but allows either to halve $\delta\theta_{max}^{out}$ or to double the number of channels N by keeping $\delta\theta_{max}^{out}$ unchanged. Because an angular deviation usually introduces additional losses and cross-talk, this approach essentially maximizes the weakest transmission coefficient of the WGR, thus improving the performance of the so-called worst case configuration.

Other criteria can be considered, as well to improve the characteristics of the WGR which might be others than the optimization of the worst case transmission. For example, an improvement can be also obtained by shifting the output ports so to minimize the mean square value (or any other weighted average) of $\delta\theta_{max}^{out}$ or $\delta\theta_{j,i}^{out}$ for each output port. However, this might not completely optimize the worst case.

Figure 5:
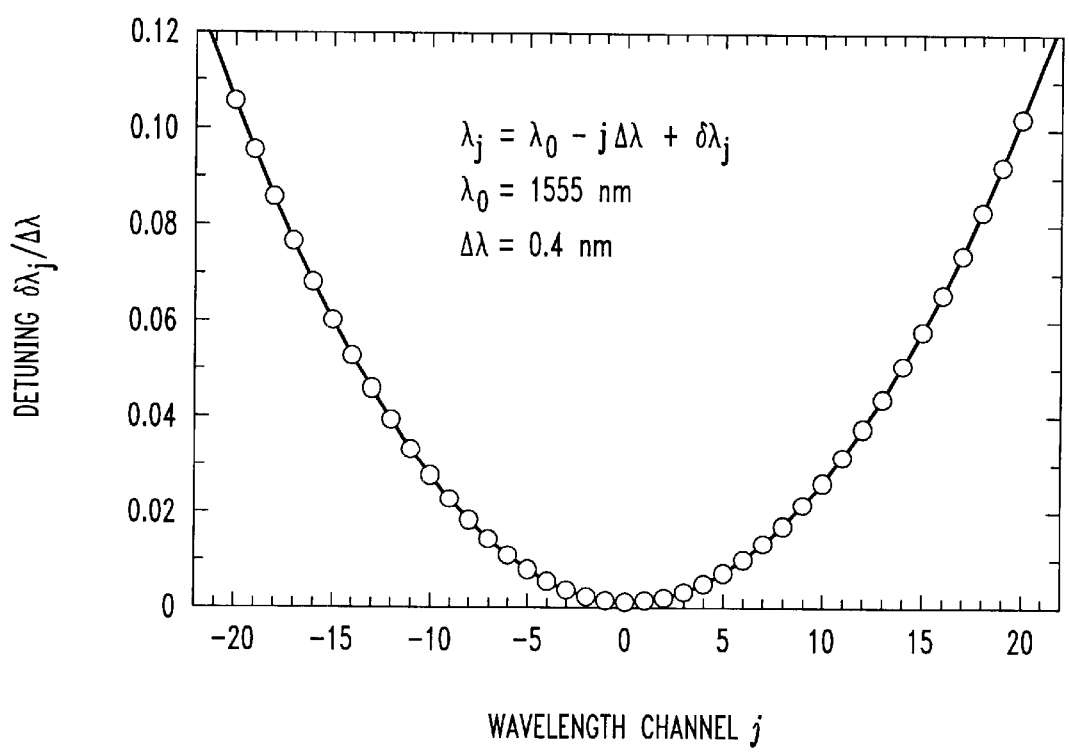
FIG. 5 shows the calculated detuning from the exact equally spaced wavelengths which minimizes the relative maximum angular deviation $\delta\theta_{max}^{out}/\Delta\theta^{out}$ in an illustrative 41×41 WGR.

Similar improvements as those depicted in FIG. 4a can also be obtained by a fine tuning of the N equally spaced wavelengths (so that the spacing is not quite equal) instead of shifting the output ports. With a parabolic detuning $\delta\lambda(<\Delta\lambda)$ of the equally spaced wavelengths, as shown in FIG. 5, it is possible to minimize $\delta\theta_{max}^{out}$ to about half of the original value. For comparison the relative deviation $\delta\theta_{j,i}^{out}/\Delta\theta^{out}$ is plotted in FIG. 4b where it can be noticed that the global performance in this case is slightly better.

The above approaches can be also implemented for channels equally spaced in frequency but the improvements that can be achieved are insignificant. In fact, FIG. 3b clearly shows that, for example, a homogeneous shift of the output port cannot be efficient due to the opposite sign of $\delta\theta_{j,i}^{out}$ on the wings 305 and 306. A better result can be achieved if each output port is shifted separately. The fine tuning of the equally spaced frequencies does not bring in any substantial improvement either.

Finally, it is worth mentioning that if the condition to use the same set of N wavelengths or frequencies for all input ports is dropped, it is always possible to chose N wavelengths or frequencies for each input port so that $\delta\theta_{max}^{out}=0$. In this case, with the help of FIG. 2b it can be easily demonstrated that for equally spaced wavelength this can be achieved by selecting the N wavelength from a set of K wavelengths where K=2N. For equally spaced frequencies K>2N.

Specific Implementation

In one example implementation, a 40×40 WGR device uses channels with wavelengths equally spaced by $\Delta\lambda=0.4$ nm. To reduce $\delta\theta_{max}^{out}$ the position of the output ports has been uniformly shifted by half of this angle, as explained in the prior section. The device operates with a diffraction order m=95 which, with N=40, approximately fulfills Eq. (10). However, as already mentioned, the stringent limits for the deviation $\delta\theta_{j,i}^{out}$ are given by the angular aperture covered by one output port which is of course smaller than $\Delta\theta$. In our case we calculate that $\delta\theta_{j,i}^{out}$ deviates from the axis of the output ports by less than one fifth of the total angular aperture covered by a single output port.

Such small misalignments are revealed by the calculated transmission spectrum of the device.

The peaks are not perfectly spaced by 0.4 nm but to slightly drift from the exact position. The worst channel mismatch is less than 10% of the channel spacing and from such misalignment an additional loss of less than 1.5 dB is expected at the exact wavelength.

Figure 6B:
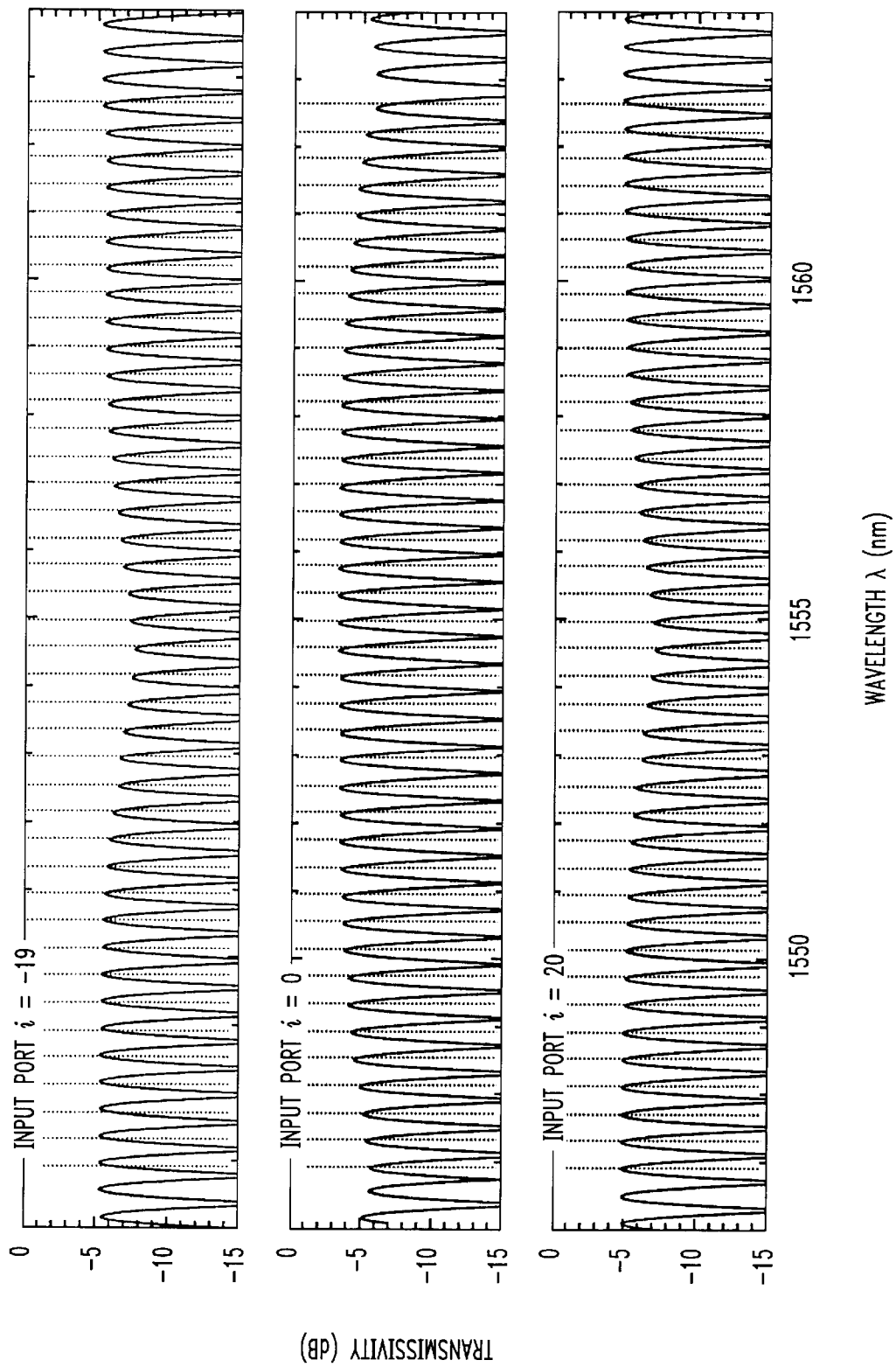
FIG. 6b shows the comparison among the spectra obtained from the central port (center) and the two most lateral ports (top and bottom), where the dotted grid represents the channel spacing of 0.4 nm.

With reference to FIG. 6, there is shown the measured fiber-to-fiber transmission spectra referred to the central input port (i=0) in an illustrative 40×40 WGR with channels equally spaced by $\Delta\lambda=0.4$ nm and shifted output ports. FIG. 6b shows the comparison among the spectra obtained from the central port (center) and the two most lateral ports (top and bottom), where the dotted grid represents the channel spacing of 0.4 nm. In FIG. 6a and 6b each of the curves 601 represents the transmission spectrum obtained at the 40 different output ports when a white source illuminates one input port. The positions of the peaks agree very well with the calculations although globally shifted by 0.8 nm towards shorter wavelengths. The insertion losses measured at the peaks range from 4 and 6 dB while the additional loss due to $\delta\theta_{j,i}^{out}$ is less than 1.5 dB in the worst case. Thus, our specific implementation of a WGR can operate as a 40×40 cross-connect with one set of 40 wavelengths.

The adjacent crosstalk level of the 40×40 WGR device is about −25 dB while the average crosstalk level is 5 dB lower. These values shall be improved by a more precise design of the device and a more accurate fabrication process.

In another embodiment, an 80×80 WGR device is also based on the same improvement techniques described above for the 40×40 WGR device. However, in order to let the device cross-connect 80 channels spaced by 0.4 nm the wrap-around requirements demand the WGR to operate in the diffraction order m=47. Thus, N/m clearly exceeds unity so that Eq. (10) is not fulfilled any more. Therefore, channels deviation is larger than the distance between two adjacent output ports so that the wavelength mapping between the input and output ports is lost.

Figure 7:
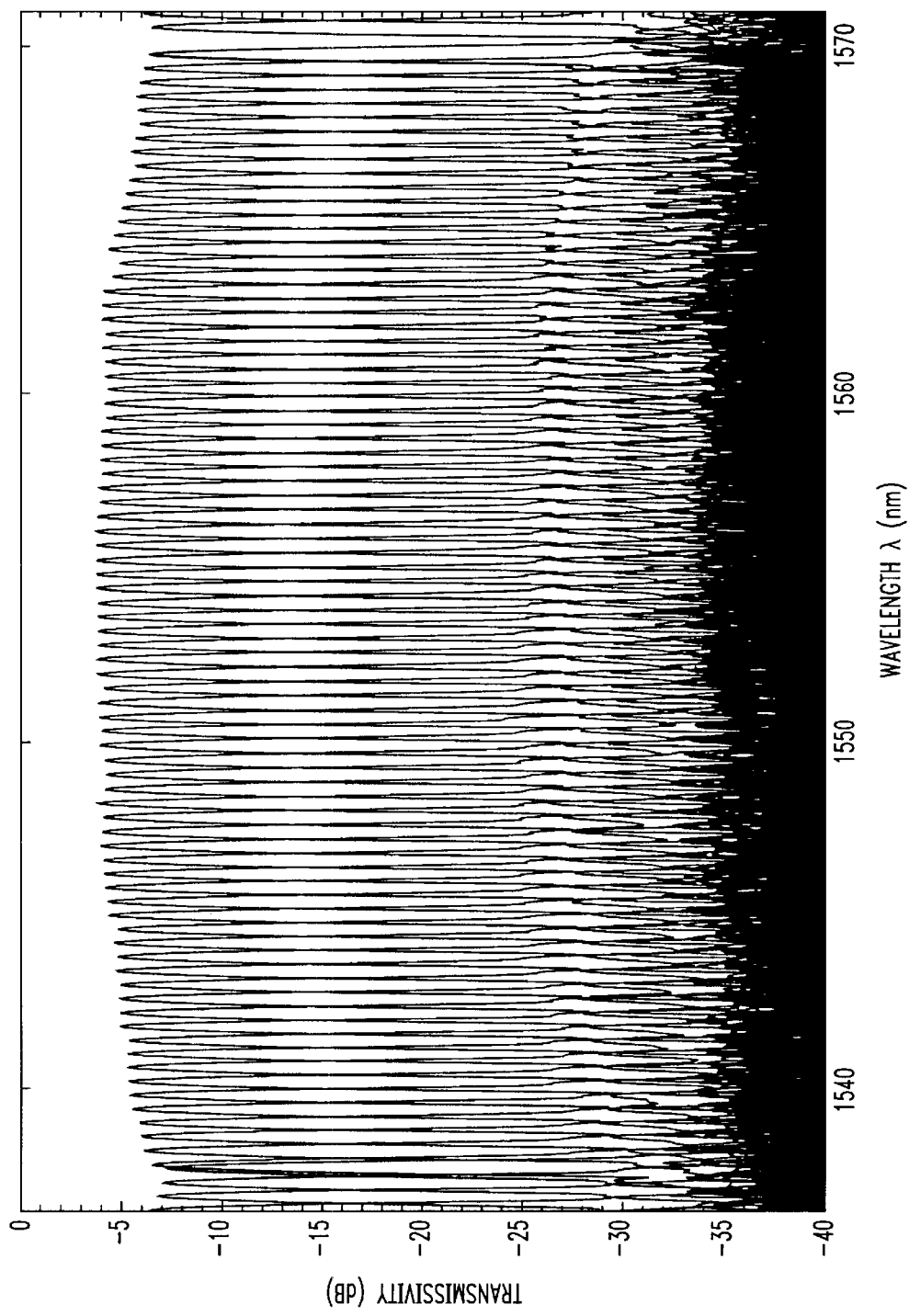
FIG. 7 shows the measured fiber-to-fiber transmission spectra referred to the central input port (i=0) in an illustrative 80×80 WGR with channels equally spaced by $\Delta\lambda$=0.4 nm and shifted output ports.

This can be seen by calculating the transmission spectra of such device. Simulations show that the channels belonging to different diffraction orders either overlap or leave gaps in between. The simulations are supported by the measurements shown in FIG. 7 where on the right side the first channel of the diffraction order m−1 overlaps with the last channel of the order m while on the other side of the spectrum a gap opens between the first channel of the order m and the last one of the order m+1.

Conclusions

Larger N×N WGR are achieved when the optical channels are equally spaced in wavelength and the upper limit is given by Eq. (10). Therefore, the smaller the channel spacing, the larger the N. However, channels which are too close to each other require the device to have narrower passbands and this fact has to be taken into account when the WGR has to support high bit rates. In addition, other factors like the width of the output ports, the tolerated losses and cross-talk, can further reduce N.

The properly repositioning of the output ports, produces a WGR device having increase N, although additional losses have been introduced. With this new arrangement and a given channel spacing of 0.4 nm we doubled N from 20 to 40 without affecting the worst case performance of the device. The maximum allowed by Eq. (10) is N =62. With additional improvements a 50×50 WGR can be implemented.

An implementation of 80×80 WGR device could not be operated with a single set of 80 wavelength for all the input ports. Nevertheless, such a device is practical in a system which provides for independent wavelength tuning at each input port. Another technique enables large N×N WGR devices when the wavelengths can be selected from a large number of available wavelengths 2N. One application of this technique may be when large N×N WGR are used as a switch fabric inside an optical internet protocol (IP) router.

What has been described is merely illustrative of the application of the principles of the present invention. Other methods and arrangements can be implemented by those skilled in the art without departing from the spirit and scope of the present invention.

APPENDIX

REFERENCES

[1] C. Dragone, "A N×N optical multiplexer using a planar arrangement of two star couplers", IEEE Photon. Technol. Lett. 3, 812–815 (1991).

[2] C. Dragone, C. A. Edwards, and R. C. Kistler, "Integrated optics N×N multiplexer on silicon", Photon. Technol. Lett. 3, 896–899 (1991).

[3] H. Takahashi, S. Suzuki, K. Katoh, and I. Nishi "Arrayed-waveguide grating for wavelength division multi/demulti-plexer with nanometer resolution", Electron. Lett. 26, 87–88 (1990).

[4] K. Okamoto, K. Moriwaki, and S. Suzuki, "Fabrication of 64×64 arrayed-waveguide grating multiplexer on silicon", Electron. Lett. 31, 184–186 (1995).

[5] K. Okamoto, T. Hasegawa, O. Ishida, A. Himeno, and Y. Ohmori, "32×32 arrayed-waveguide grating multiplexer with uniform loss and cyclic frequency characteristics", Electron. Lett. 33, 1865–1866 (1997).

[6] H. Takahashi, K. Oda, H. Toba, and Y. Inoue, "Transmission characteristics of arrayed wave guide N×N wavelength multiplexer", J. Lightwave Technol. 13, 447–455 (1995).

[7] M. K. Smit, "New focusing and dispersive planar component based on an optical phase array", Electron. Lett. 24, 385–386 (1988).

What is claimed is:

1. A waveguide grating router (WGR) comprising input and output N×M star couplers connected by M waveguides of unequal length, the input coupler having N equally spaced input ports, each input port for receiving an input signal having N equally spaced wavelengths, the output coupler having N output ports, each output port for outputting an output signal having N equally spaced wavelengths, the WGR further characterized by said output coupler having N output ports that are not uniformly spaced.

2. The WGR of claim 1 wherein the position of the output ports of said output coupler is shifted by about one half of $\delta\theta_{max}^{out}$ from the position defined by the N images of the N wavelengths dispersed by the central input port, where $\delta\theta_{max}^{out}$ is the maximum angular deviation between the position of the output port as just defined and the position of the N images of the N wavelengths expected to converge to the said port.

3. The WGR of claim 1 wherein the center axis of each output port is located at the center of the distribution of output signals from each of the N input ports.

4. The WGR of claim 1 wherein the center axis of each output port is placed to maximize the weakest wavelength signal transmission coefficient for any wavelength dispersed from any of the N input ports.

5. The WGR of claim 1 wherein one or more wavelengths appearing at one or more of the N output ports are of different diffraction orders.

6. A waveguide grating router (WGR) comprising an input and an output N×M star couplers connected by M waveguides of unequal length, the input coupler having N equally spaced input ports, each input port for receiving an input signal having N equally spaced wavelengths or frequencies and the output coupler having N output ports, each output port for outputting an output signal having N equally spaced wavelengths or frequencies, the WGR further characterized by said output coupler having N output ports that are spaced to maximize the weakest signal transmission coefficient of at least one of the N wavelengths or frequencies dispersed from any of the N input ports.

7. The WGR of claim 6 wherein when the input signal includes N frequencies, the spacing between adjacent output ports of said output coupler varies in an asymmetric and non-linear manner from the central port.

8. A method of operating a waveguide grating router (WGR) comprising input and output N×M star couplers connected by M waveguides of unequal length, the input coupler having N equally spaced input ports for receiving an input signal having N equally spaced wavelengths, the output coupler having N output ports for outputting an output signal having N equally spaced wavelengths, the method comprising the steps of:

receiving an input signal at each input port having N equally spaced wavelengths, and arranging the spacing of the N output ports of said output coupler so as to increase a signal transmission coefficient from each of a plurality of the N input ports to a plurality of the N output ports.

* * * * *